May 2, 1950
D. COLLINS
2,506,544
AUXILIARY CONTROL FOR HYDRAULIC BRAKES
Filed March 7, 1949
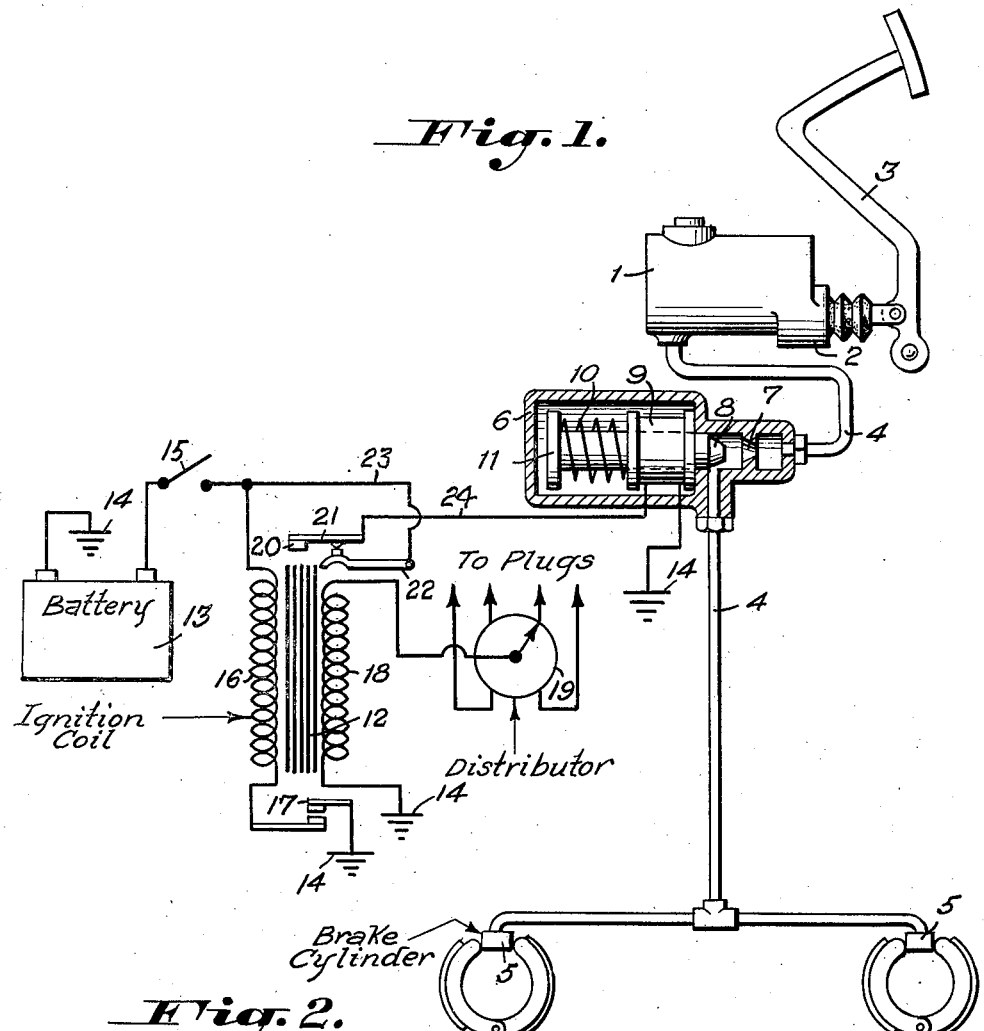
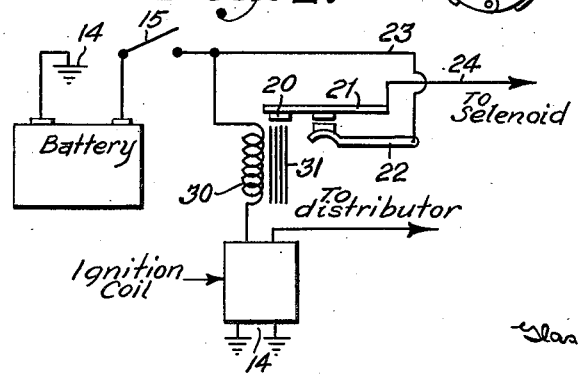
INVENTOR.
Douglas Collins
BY:
Glascock, Downing & Seebold
Attorneys Patented May 2, 1950

2,506,544

UNITED STATES PATENT OFFICE 2,506,544

AUXILIARY CONTROL FOR HYDRAULIC BRAKES

Douglas Collins, Salisbury, N. C.

Application March 7, 1949, Serial No. 79,931

10 Claims. (Cl. 192—3)

This invention relates to braking mechanism of motor vehicles and more particularly to control means therefor of the type commonly known as a "no-back" device.

The object of the invention is to provide an arrangement in which the variations in the intensity of the magnetic field of the core of the engine ignition coil due to changes in the speed of operation of the vehicle propelling engine are utilized to control operation of the valve by which the brakes are held in applied position.

A further object of the invention is the provision of an auxiliary control for hydraulic brakes of the type above described which may be conveniently combined with existing types of vehicle ignition and brake systems and which will operate reliably to maintain the brake holding valve in closed position while the engine is operating at idling speed.

Others objects will become apparent from the following detailed description taken in connection with the accompanying drawing, in which Figure 1 is a diagrammatical view showing the invention combined with the ignition and brake systems of a motor vehicle and Figure 2 is a fragmentary view showing a modification of the device.

Referring to the drawing in detail, the numeral 1 indicates the usual oil reservoir of the hydraulic brake system of a motor vehicle which supplies oil to the master cylinder 2, which latter is operated by the usual brake pedal 3. As usual in such brake systems the oil is forced under pressure from the master cylinder 2 through the pipes 4 to the brake cylinders 5 which latter may be as numerous as required, depending upon the requirements of the vehicle to which the brake system is applied.

The oil pipe 4 is divided at a convenient point between the ends thereof and is connected with the opposed ports of a valve casing 6. The casing is provided internally with a seat 7 of tapered form to fit the correspondingly shaped end of a valve member 8 constituting the armature of a solenoid 9. A spring 10 is confined between a terminal flange 11 on the valve member and the adjacent end of the winding of the solenoid 9 and the tension of the spring normally tends to move the valve to open position. When the solenoid 9 is energized the tension of the spring 10 is overcome and the valve is moved to closed position with respect to the port in the seat 7, the arrangement being such that even though the valve is closed the pressure of the brake fluid created by operation of the brake pedal 3 operates to open the valve and move the brake fluid into the brake cylinders 5 and thereby cause application of the brakes in degree proportional to the application of force to the brake pedal.

The valve casing 6 is preferably of such form as to provide an enclosure for the solenoid 7 and the valve spring 10.

In accordance with the invention the operation of the solenoid 9 is controlled by the variations of intensity of the magnetic field of the core 12 of the coil forming part of the ignition system of the internal combustion engine (not shown) providing the mechanical power necessary for the propulsion of the vehicle. As usual, the ignition system includes a battery or other source of electrical energy, one pole 14 of which is grounded and one pole of which is connected through an ignition switch 15 with one terminal of the primary winding 16 of the ignition coil. The coil is provided with the usual breaker points 17 interposed between the opposite end of the primary winding 16 and the ground 14. Further in accordance with the conventional arrangement, one end of the secondary winding 18 is grounded at 14 and the opposite end thereof is connected with a distributor 19 by which the high tension current for the operation of the engine is supplied to the spark plugs (not shown).

In applying the invention to the ignition system an armature 20 is operatively arranged with respect to the core 12 of the ignition coil in such manner that it will be attracted when the intensity of the magnetic field attains a predetermined value. The armature is supported by a contact spring 21 provided with a contact point cooperating with a similar point on a relatively stationary contact spring 22, the arrangement being such that when the armature is attracted by the core of the coil the contacts of the two springs are closed, whereas when the intensity of the magnetic field decreases to such value that the attracting force falls below the tension of the spring 21, the latter operates to withdraw the armature from the core and thereby open the contacts of the springs 21 and 22. The fixed contact spring 22 is connected by a conductor 23 with the primary circuit preferably at a point between the ignition switch 15 and the primary winding 16, while the contact of the spring 21 is connected by a conductor 24 with one end of the coil of the solenoid 9, the opposite end of which latter is grounded at 14.

The gap between the armature 20 and the terminal of the core 12, the size of the armature and the tension of the spring 21 are factors which determine the value of the intensity of the magnetic field of the coil to which the armature 20 is attracted and the contact between the spring 21 and 22 is closed. These factors are so chosen that the circuit including the winding of the solenoid 9 is closed only while the engine is operating at idling speed. At this speed the armature is drawn toward the core closing the contacts at 21—22 and thus energizing the winding of the solenoid 9 causing the valve member 8 to engage its seat 7 and thereby close communication between the master cylinder 2 and the brake cylinders 5. In this manner the brakes of the vehicle are maintained in applied condition. As the speed of the engine is accelerated, the intensity of the magnetic field of the coil decreases and the armature 20 is retracted by the spring 21 thereby breaking the electrical contact between the spring 21 and 22 and interrupting the flow of current to the coil of the solenoid 9. Under such conditions the tension of the spring 10 is operative to open the valve member 8 and communication through the pipes 4 is re-opened and the automatic control device is no longer effective to maintain the brakes applied.

As the ignition coil functions in the conventional manner there will result a pulsating motion of the armataure 20 at idling speeds. To compensate for this, the fixed spring 22 is so formed that the contacts will remain closed until such time as the magnetic force of the core decreases, with the increased engine speed so as to allow the switch armature to "float" completely away from the core thereby opening the contacts and de-energizing the solenoid.

Instead of operating the armature 20 directly by the core of the ignition coil, an additional electro-magnetic coil may be provided. Such an arrangement is shown in Figure 2 in which the coil 30 of an electro-magnet is connected in series in the primary circuit of the ignition coil at a point, for example, between the switch 15 and the primary winding. The armature 20 is operatively arranged with relation to the core 31 of the magnetic coil 30 and the contact springs 21 and 22 are connected between the ignition switch 15 and the winding of the solenoid 9 as above described.

The operation of the arrangement shown in Figure 2 is the same as that of Figure 1, but this embodiment of the invention may be preferred in cases where it is desirable to avoid modification of the conventional form of ignition coil. According to Figure 2, the intensity of the field of the magnetic coil 30 varies in the same manner as the field of the ignition coil in dependence upon the speed of operation of the engine.

In accordance with the present invention a brake holding action is attained which is particularly desirable in vehicles equipped with fluid drive. With this type of drive there is a tendency to "creep" which necessitates the operator maintaining constant pressure on the brake pedal during the period when the vehicle remains stationary. In case the engine is at idling speed before the brakes are applied and the valve member 8 is closed by the energization of the solenoid 9, operation of the brake pedal in the conventional manner will force the valve member 8 open against the magnetic pull of the solenoid which latter will, however, return the valve to closed position when the pressure in the master cylinder is relieved.

What I claim is:

1. In combination, a hydraulic brake system including a pipe leading to the brake cylinders, a brake holding valve in said pipe, an engine ignition circuit including an ignition coil, electromagnetic means for operating said valve, and a circuit for energizing said electro-magnetic means including a circuit making and breaking device associated with said ignition coil and actuated in response to variations in the flow of current in said ignition coil due to changes in engine speed.

2. In combination, a hydraulic brake system including a pipe leading to the brake cylinders, a brake holding valve in said pipe, an engine ignition circuit including an ignition coil, an operating circuit for said valve, and means associated with said ignition coil and connected in said operating circuit responsive to variations in the flow of current in the ignition coil due to changes in engine speed for controlling said valve operating circuit.

3. In combination, a hydraulic brake system including a pipe leading to the brake cylinders, a brake holding valve in said pipe, an engine ignition coil having a core, and means including a circuit making and breaking apparatus influenced by variations in the intensity of the magnetic field of the core resulting from changes in engine speed for operating said valve.

4. In combination, a hydraulic brake system including a pipe leading to the brake cylinders, a brake holding valve in said pipe, an engine ignition coil having a core, an armature magnetically attracted by said core at engine idling speed, and means including a circuit controlled by said armature for operating said valve.

5. In combination, a hydraulic brake system including a pipe leading to the brake cylinders, a normally open brake holding valve in said pipe, an engine ignition coil having a core, and means including a circuit making and breaking apparatus influenced by the magnetic field of said core at engine idling speed for closing said valve.

6. In combination, a hydraulic brake system including a pipe leading to the brake cylinders, a brake holding valve in said pipe, an engine ignition coil having a core, a circuit, a valve operating coil interposed in said circuit, circuit controlling contacts in said circuit, and means including an armature influenced by variations in the intensity of the magnetic field of the core resulting from changes in engine speed for operating said contacts.

7. An arrangement as claimed in claim 6 wherein said armature is a yieldable member carrying one contact and a cooperating yieldable member carries the other contact.

8. In combination, an ignition system including an induction coil for an internal combustion engine adapted to propel a vehicle having hydraulic brakes, a pipe leading to the brake cylinders, a brake holding valve in said pipe, an electro-magnet associated with said valve for operating same, a circuit making and breaking apparatus including an armature mounted adjacent the core of said induction coil and carrying a contact and a complementary contact carried by a yieldable member, and a circuit extending from the battery side of the primary of said induction coil through said circuit making and breaking apparatus and electro-magnet.

9. In combination, a hydraulic braking system including a pipe leading to the brake cylinders, a brake holding valve in said pipe, an engine ignition circuit including an ignition coil, electromagnetic means for operating said valve, and a circuit for energizing said electromagnetic means including a relay having its coil connected in the circuit of said ignition coil and its contacts connected to said electromagnetic means, said relay being actuated in response to variations in the flow of current in said ignition coil due to changes in engine speed.

10. In combination, a hydraulic brake system including a pipe leading to the brake cylinders, a brake holding valve in said pipe, an engine ignition coil, and an electromagnetic relay having its coil connected in series with the primary winding of said ignition coil, said relay being arranged to operate said brake holding valve in response to the variations in the current through said winding resulting from changes in engine speed.

DOUGLAS COLLINS.

REFERENCES CITED

The following references are of record in the file of this patent:

UNITED STATES PATENTS

| Number | Name | Date |
| --- | --- | --- |
| 2,297,692 | Chambers | Oct. 6, 1942 |
| 2,329,156 | Coffey | Sept. 7, 1943 |